United States Patent Office 2,741,320
Patented Apr. 10, 1956

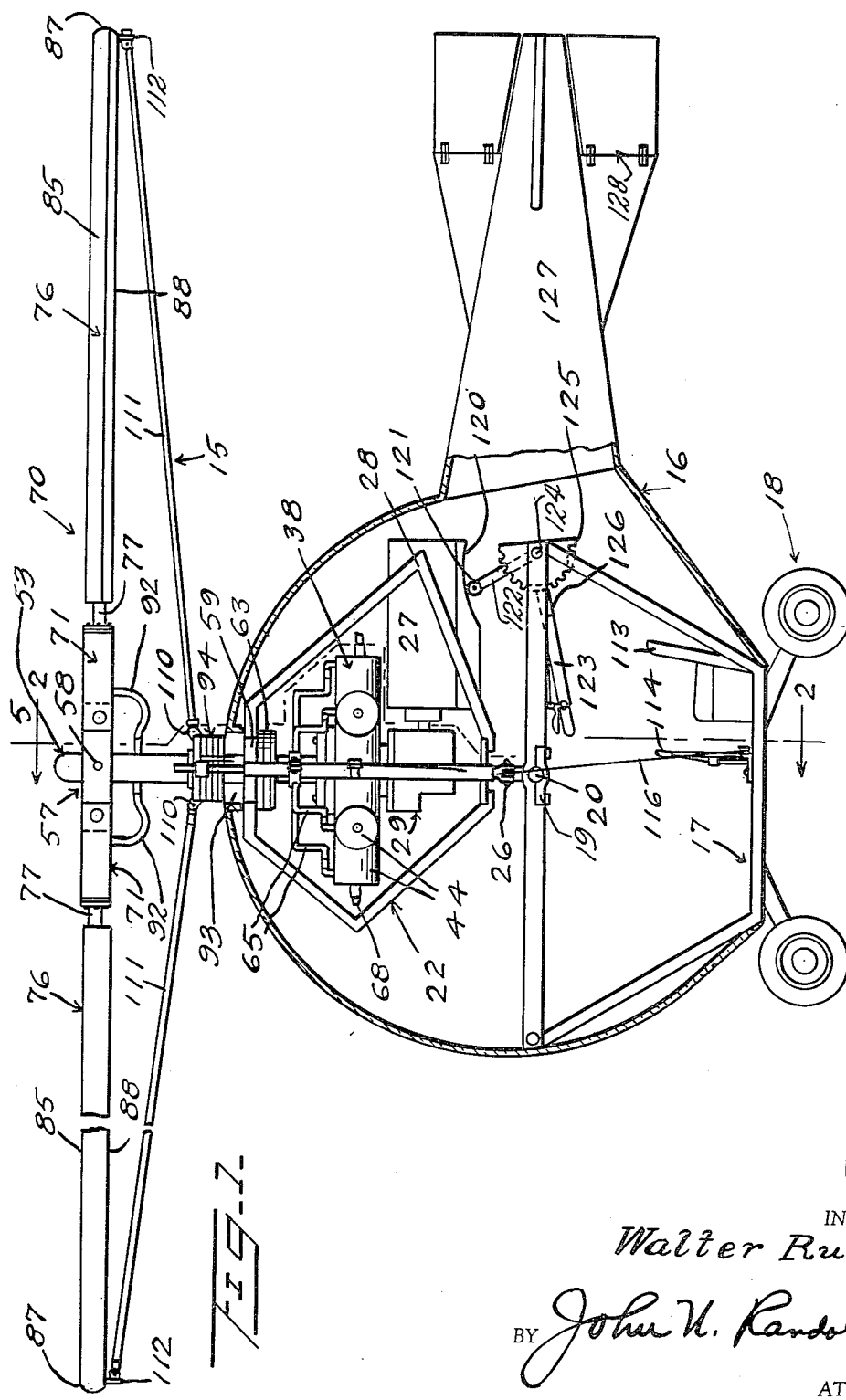

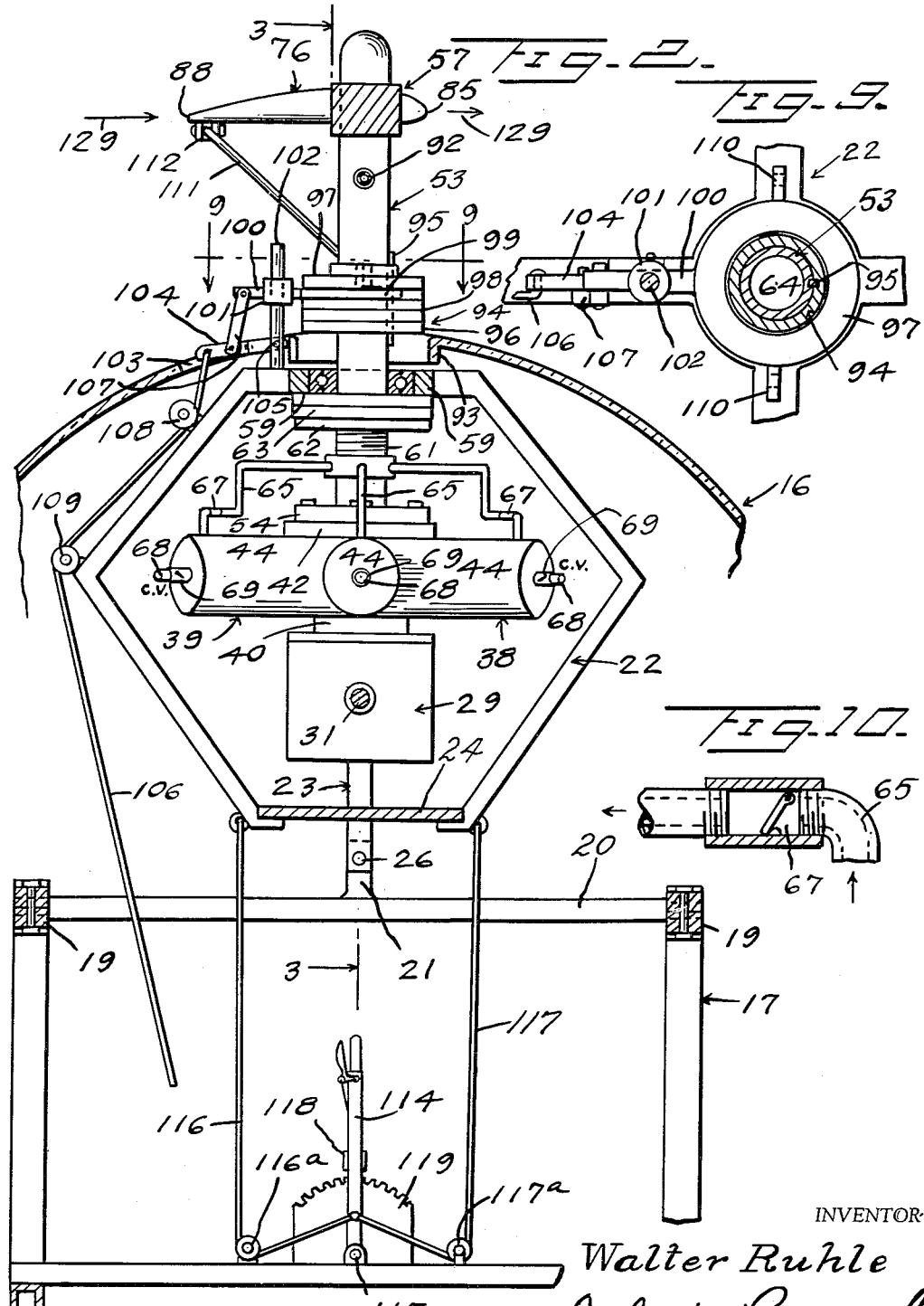

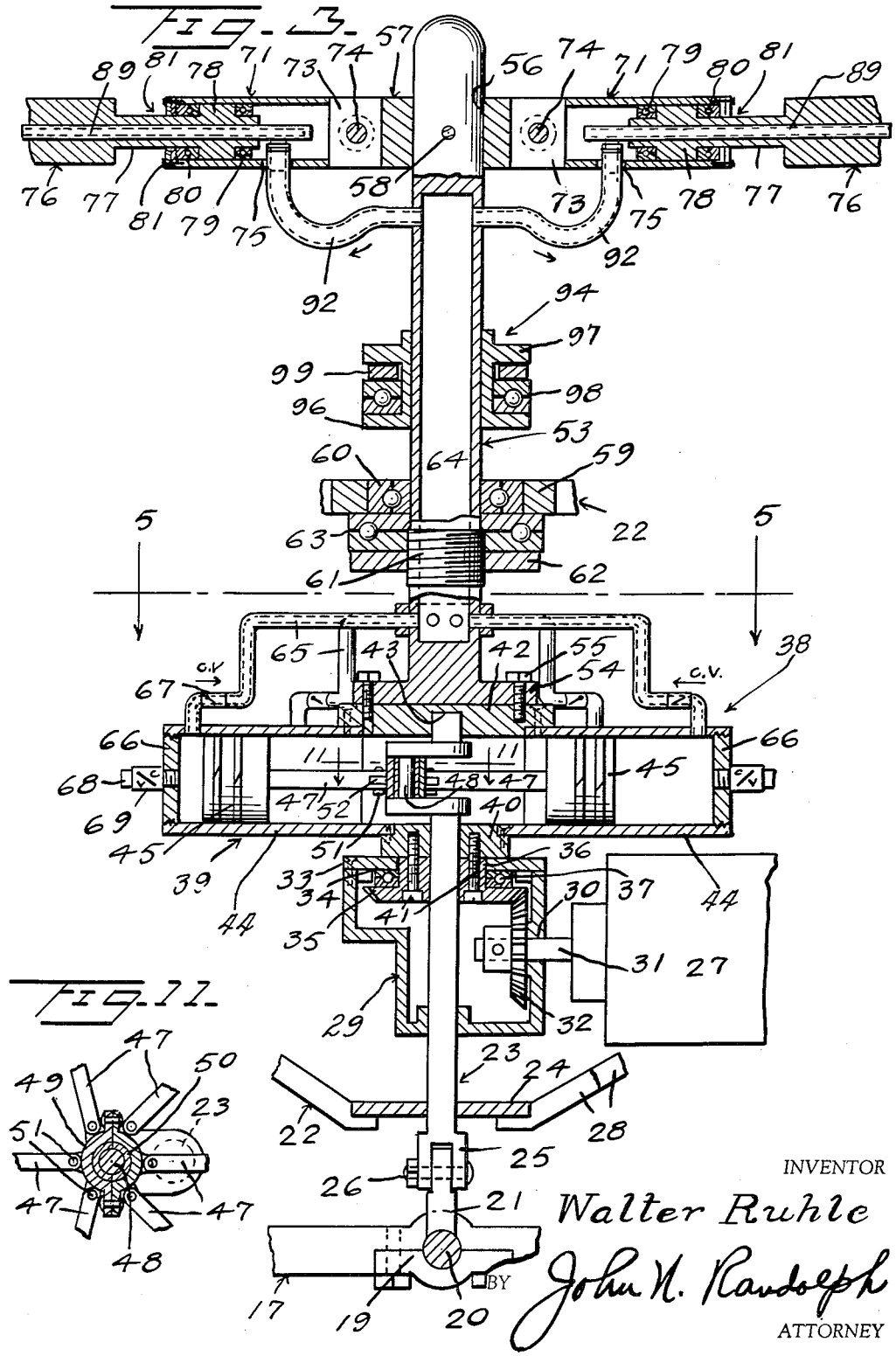

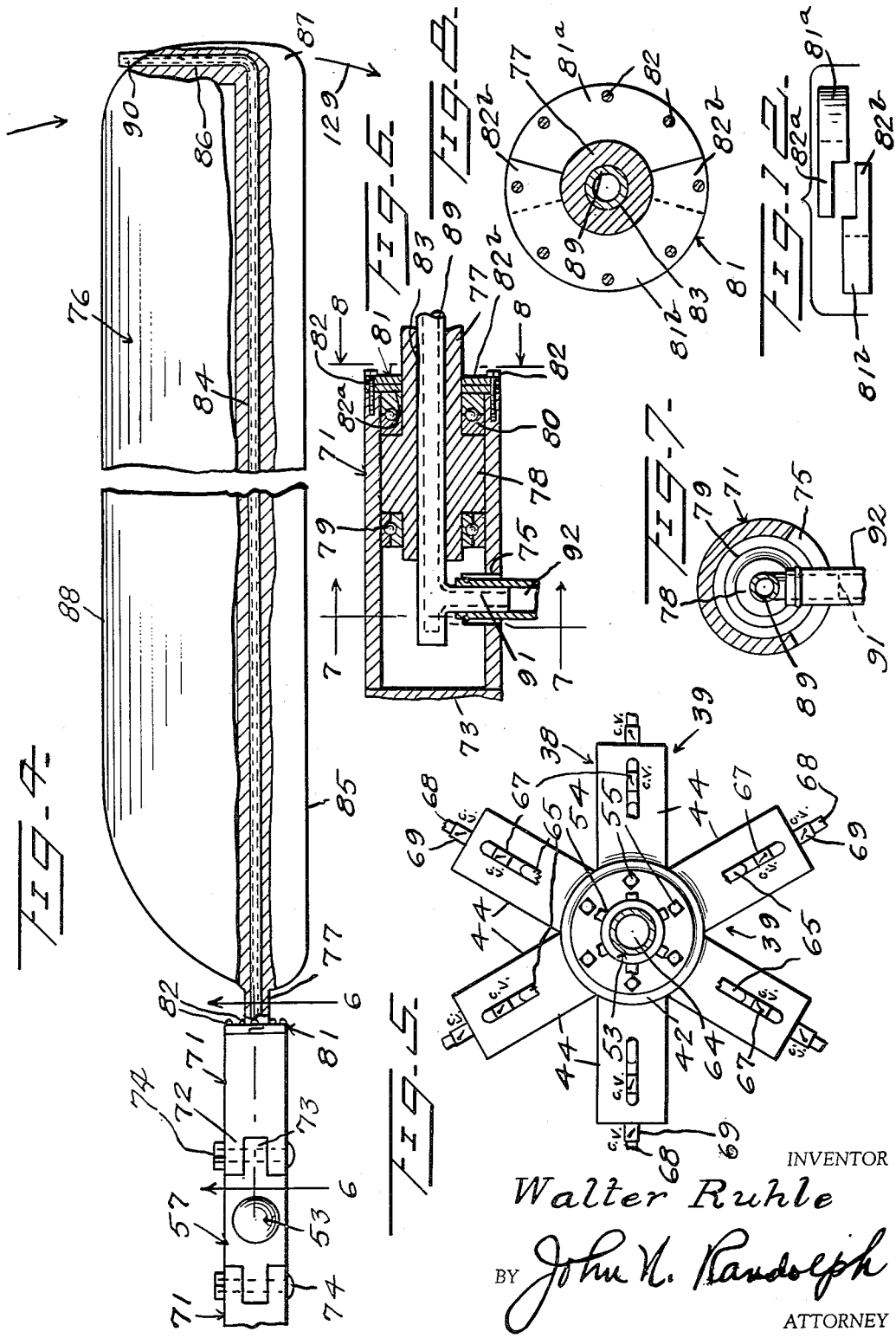

2,741,320

HELICOPTER WITH JET DRIVEN ROTOR

Walter Ruhle, Arvida, Quebec, Canada

Application September 15, 1954, Serial No. 456,255

10 Claims. (Cl. 170—135.4)

This invention relates to a novel construction of helicopter and more particularly to a novel means whereby the sustaining and translational propelling rotor blades or wings of a helicopter are driven by jet propulsion to thereby minimize the torque between the rotor shaft and the fuselage of the aircraft.

Another object of the invention is to provide a helicopter type aircraft whereby due to the unique driving arrangement between the rotor blades and engine, a smaller and lighter engine may be utilized than is normally required and yet which will be adequate to supply the necessary propulsion force for driving the rotor.

Still another object of the invention is to provide a novel system for mounting a helicopter engine and the sustaining rotor thereof whereby said parts may be rocked as a unit longitudinally and laterally of the fuselage for controlling the direction of movement of the aircraft when aloft.

Still a further object of the invention is to provide a novel driving connection between the engine or power source of a helicopter and its sustaining rotor whereby the rotor will be partially driven by a mechanical connection to the engine but primarily driven by jet propulsion whereby the rotor will afford substantially no drag on the engine through the mechanical connection of the rotor and engine.

Various other objects and advantages of the invention will hereinafter become more fully apparent from the following description of the drawings, illustrating a presently preferred embodiment thereof, and wherein:

Figure 1 is a side elevational view, partly in vertical section, of a helicopter or similar type aircraft constructed in accordance with the invention:

Figure 2 is an enlarged fragmentary vertical sectional view taken substantially along a plane as indicated by the line 2—2 of Figure 1;

Figure 3 is an enlarged fragmentary vertical sectional view taken substantially along a plane as indicated by the line 3—3 of Figure 2;

Figure 4 is a fragmentary top plan view, partly in section, of a portion of the rotor;

Figure 5 is a horizontal sectional view, on a reduced scale, taken substantially along a plane as indicated by the line 5—5 of Figure 3;

Figure 6 is an enlarged fragmentary vertical sectional view taken substantially along a plane as indicated by the line 6—6 of Figure 4;

Figure 7 is a cross sectional view taken substantially along a plane as indicated by the line 7—7 of Figure 6;

Figure 8 is an enlarged cross sectional view taken substantially along a plane as indicated by the line 8—8 of Figure 6;

Figure 9 is an enlarged horizontal sectional view taken substantially along a plane as indicated by the line 9—9 of Figure 2;

Figure 10 is an enlarged view partly in elevation and partly in section illustrating one of the outlet check valves of the compressor in detail;

Figure 11 is an enlarged horizontal sectional view, taken substantially along a plane as indicated by the line 11—11 of Figure 3, and Figure 12 is an exploded edge elevational view of the retaining collar as illustrated in Figure 8.

Referring more specifically to the drawings, the helicopter type aircraft in its entirety and comprising the invention is designated generally 15 and includes a forward fuselage portion 16 having a frame 17 fixedly mounted in the bottom part thereof. A landing gear 18 secured to the bottom of the frame 17 is disposed beneath the bottom of the front fuselage portion 16. The frame 17 includes transversely aligned bearings 19 constituting a part of the upper portion thereof and which are located substantially midway of the front and rear ends of said frame. A cross shaft 20 is journalled in the bearings 19 and is provided, intermediate of its ends, with an upstanding ear 21.

An upper frame 22 is disposed in the upper part of the forward fuselage end 16. A stationary shaft or rod 23 has a lower part extending downwardly through and secured in a bottom part 24 of the upper frame 22 and terminates therebeneath in a bifurcated portion 25 which loosely straddles the upper end of the ear 21 and is pivotally connected thereto by a fastening 26. Thus, the frame 22 is supported by the shaft 20 for rocking movement in a direction longitudinally of the aircraft 15, and by means of the fastening 26, said frame 22 is mounted for transverse rocking movement relative to the longitudinal axis of the aircraft.

An engine 27, of any conventional type, such as an internal-combustion engine, is mounted in and secured between rear portions 28 of the upper frame 22. A gear box 29 is mounted on the stationary rod or shaft 23, forwardly of and substantially in alignment with the engine 27, and has a journal 30 in a rear wall thereof through which the engine drive shaft 31 extends and in which said shaft is journalled. A beveled gear 32 is fixed to the shaft 31 and is rotatably disposed in the gear box 29. The gear box 29 is provided with a detachably mounted top wall 33 having a relatively large central opening 34. A beveled gear 35 is journalled on the rod or shaft 23 within the gear box 29 and meshes with the beveled gear 32. The gear 35 has a hub portion 36 projecting from its back side upwardly through the opening 34 in which said hub portion is turnably disposed. A thrust bearing 37 is mounted around the gear hub 36 between the underside of the gear box top 33 and the head of the gear 35.

A radial type air compressor 38 includes a housing, designated generally 39, having a bottom portion provided with a centrally disposed external depending boss 40 which is disposed against the upper end of the gear hub 36 and detachably secured thereto by fastenings 41 which extends through the gear 35 and into the boss 40. The housing 39 is provided with a centrally disposed top portion 42, likewise constituting an external boss, which like the boss 40 forms a detachable part of the housing 39. The upper housing portion or boss 42 is provided with a downwardly opening socket 43 which turnably fits on the upper end of the stationary shaft or rod 23 for supporting the compressor 38 above the gear box 29 for rotation with the upper beveled gear 35.

As seen in Figure 5, the compressor housing 39 includes a plurality of radially disposed cylinders 44. As illustrated in Figure 3, a piston 45 is reciprocably mounted in each of the cylinders 44. Each piston 45 has an inwardly extending piston rod 47. The stationary shaft or rod 23 is provided with a crank 48 which is disposed in the plane of the cylinders 44 and around which a collar 49, formed of sections, is journalled, as seen in Figure 11. A bushing 50 may be interposed between the crank or eccentric 48 and said collar 49. The opposite adjacent ends of the piston rods 47 are pivotally connected by fastenings 51 to ears 52 which extend outwardly from the two collar sections.

A rotor supporting shaft 53 has a flanged lower end 54 which rests on the upper compressor housing boss 42 and it is secured thereto by fastenings 55. The upper end of the shaft 53 extends through an opening 56 which is formed in the intermediate portion of an elongated rotor hub 57. The hub 57 is secured to the upper portion of the shaft 53 by a suitable fastening 58. The frame 22 includes an annular top portion 59 through which a part of the shaft 53 loosely extends and an antifriction bearing 60 is mounted in said annular frame portion 59 and around the shaft 53 for journalling said shaft relatively to the frame 22. The shaft 53, below the part thereof which extends through the bearing 60, is provided with a threaded part 61 on which a nut 62 is threadedly mounted. The nut 62 provides an adjustable support for a thrust bearing 63 which is disposed around the shaft 53, between said nut and the annular top frame part 59 to resist upward displacement of the shaft 53. The shaft 53 includes a hollow or tubular portion 64 which extends from above and adjacent its flanged lower end 54 upwardly to beneath and adjacent the part of the shaft engaged by the rotor hub 57. A plurality of conduits 65 have adjacent ends connected to the shaft 53 and communicating with the chamber 64 thereof between the flange 54 and the threaded shaft portion 61, said ends of the tubes 65 being arranged in circumferentially spaced relation around the shaft 53. The opposite ends of the tubes or conduits 65 are connected to and open into the cylinders 44 adjacent the outer end walls 66 thereof. Each conduit 65 is provided with a check valve 67 which opens away from the cylinder 44 to which said conduit is connected. The end wall 66 of each cylinder 44 is provided with an inlet port 68 having an inwardly opening check valve 69.

A rotor 70, of which the hub 57 forms a part, includes a pair of corresponding connector sleeves 71 having bifurcated adjacent ends 72 which straddle restricted end portions 73 of the hub 57 and are secured thereto by fastenings 74 for detachably mounting the connector sleeves 71 rigidly on the ends of the hub 57, as best seen in Figure 4. Each sleeve 71 near its bifurcated inner end in the underside thereof is provided with a transversely elongated slot 75.

The rotor 70 includes a pair of corresponding rotor wings or blades 76 each of which has a shaft 77 forming an extension of its inner end. Each shaft 77, remote from the inner end of the wing 76, is provided with an enlargement 78 sized to turnably fit in one of the sleeves 71, as seen in Figure 6. The shaft ends which engage in the sleeves 71 are spaced outwardly with respect to the slots 75. An antifriction bearing 79 is mounted around the distal end of each shaft 77 and within the sleeve 71 thereof and on one side of its enlargement 78. A thrust bearing 80 is mounted around the shaft 77 on the opposite side of its enlargement 78 and also within the outer end of the sleeve 71. The thrust bearings 80 bear against collars 81 which are formed of sections 81a and 81b having overlapping portions 82a and 82b, respectively, of reduced thicknesses. The assembled collar sections 81a and 81b are secured around the shaft 77 and detachably against the open end of the sleeve 71 by fastenings 82, which extend through the collar sections and into the wall of the sleeve 71. The collars 81 provide journals for the shafts 77 and abutments for the thrust bearings 80.

The shafts 77 have bores 83 extending longitudinally therethrough which align with longitudinally extending bores of the wings 76, as seen at 84 in Figure 4. The bore 84 of each wing 76 extends in substantially a straight line from its inner end to adjacent its outer end and is disposed adjacent the leading edge 85 of the wing or blade 76. The bore 84 turns rearwardly and includes a rearwardly extending portion 86 disposed in the wing tip 87 and opening rearwardly therefrom through a rounded rear edge portion of the wing tip 87 which joins with the trailing edge 88 of the wing or blade 76. A pipe or conduit 89 extends from end-to-end through the registering bore portions 83, 84 and 86 and has a discharge end 90 opening outwardly of the open rear end of the bore portion 86. The other inner end of each conduit 89 terminates in a laterally turned inlet end portion 91 which is disposed within the connecting sleeve 71, inwardly with respect to the inner end of the wing shaft 77, and which projects toward and into the slot 75. The inlet conduit ends 91 are connected to complementary remote ends of lengths of hose or flexible conduits 92, which are also disposed for movement in the slots 75, and the opposite adjacent ends of the hoses 92 are connected to the shaft 53 and open into the chamber 64 thereof, near the upper end of said chamber. The upper part of the forward fuselage portion 16 is preferably substantially dome shaped, as illustrated in Figures 1 and 2, and the topmost portion thereof is provided with a relatively large flanged opening 93 which is disposed loosely around the shaft 53 and above and spaced from the top frame portion 59. A collar 94 is slidably keyed as seen at 95 to the shaft 53 and is normally disposed above the flanged opening 93 and substantially below the adjacent ends of the hoses 92 which connect with said shaft 53. As best seen in Figure 3, the collar 94 includes an annular bottom flange 96 and an annular top flange 97. An annular thrust bearing 98 is supported on the bottom flange 96 and may be applied thereto before one of the flanges 96 or 97 is formed. The two tines constituting the head 99 of a fork straddle the collar 94 and are disposed between the thrust bearing 98 and the top flange 97. Said fork also includes a shank 100 which is provided intermediate of its ends with a sleeve 101. The sleeve 101 is disposed perpendicular to the plane of the fork 100 and slidably engages a post 102 which is fixed to and rises from an upper part of the frame 22. The post 102 extends loosely through a relatively large opening or recess 103 in the upper part of the front fuselage portion 16. A lever 104 is pivotally mounted at 105, adjacent to one end thereof, on the post 102, near to but spaced from the lower end of said post and extends outwardly therefrom and is disposed for swinging movement in and through the opening or recess 103. One end of a flexible member 106 is secured to the outer end of the lever 104. A link 107 has a lower end pivotally connected to the lever 104 intermediate of its ends and an upper end pivotally connected to the outer end of the fork shank 100. The flexible member 106 extends downwardly along one side of the frame 22 and is trained under an upper pulley 108 and over a lower pulley 109, which pulleys are supported on said frame side.

As seen in Figures 1 and 9, the upper collar flange 97 is provided with a pair of oppositely disposed outwardly and upwardly projecting ears 110 to which adjacent ends of a pair of rods 111 are pivotally connected. The wings or blades 76 adjacent their tips 87 and trailing edges 88 are provided with depending ears 112 to which the remote ends of the rods 111 are pivotally connected.

A pilot's seat 113 is mounted in the lower rear part of the bottom frame portion 17. A lever 114 is pivotally mounted at its lower end at 115 in front of the pilot's seat 113 for swinging movement transversely of the aircraft 15. A pair of flexible members 116 and 117 have upper ends attached to laterally spaced portions of the upper frame 22 on opposite sides of its pivot 26. The flexible members 116 and 117 extend downwardly and under pulleys 116a and 117a, which are secured to parts of the bottom frame 17. Said flexible members extend from said pulleys toward one another and are secured at their opposite ends to the lever 114 above its pivot 115. A conventional latch 118 may be carried by the lever 114 for selective engagement with a latch segment 119, fixed to the frame part 17, for latching the lever in different angular adjusted positions.

The underside of the engine 27 is provided with a concavely bowed longitudinally extending bottom surface portion 120 which is engaged by a roller 121 journalled on the distal end of the shorter arm 122 of an L-shape lever having a longer arm 123. Said lever is pivotally mounted at 124 at the apex of its arms on the rear end and upper part of the bottom frame 17, so that the lever arm 122 extends upwardly and the lever arm 123 extends forwardly, as seen in Figure 1. A latch segment 125 is fixed to the frame 17 concentrically with respect to the pivot 124 and is selectively engaged by a latch member 126, carried by the lever arm 123, to retain the lever arms 122 and 123 in selected adjusted positions relatively to the frame 17.

The aircraft 15 includes a fuselage tail portion 127 constituting a restricted extension of the rear part of the front fuselage portion 16, the trailing end of which carries control surfaces, designated generally 128, of conventional design and which may be controlled from the pilot's seat in any conventional manner, not shown.

Assuming that the aircraft 15 is supported on the ground by its landing gear 18 and that the sustaining and propelling rotor 70 is disposed as seen in Figure 1, to cause the aircraft to ascend the motor 27 is rendered operative for driving the beveled gear 32. In order that the aircraft will ascend vertically or substantially vertically, the frame 22 is supported as illustrated in Figure 1 with the stationary shaft 23 disposed vertically and the collar 94 is positioned to provide a proper pitch for the blades or wings 76. Rotation of the beveled gear 32 drives the beveled gear 35 which is meshed therewith and also causes the compressor 38 to be revolved, which in turn revolves the rotor shaft 53 and the rotor 70. Said parts revolve relatively to the gear box 29, the upper frame 22 and the front fuselage part 16. Said aforementioned rotary driven parts will be revolved in a direction to cause the rotor 70 to turn clockwise as seen in Figure 4 as viewed from above, or in the direction as indicated by the arrows 129 in Figures 2 and 4. This will cause the rotor 70 to exert a lifting and sustaining force on the aircraft 15 for raising the aircraft off of the ground. However, the engine 27 thus mechanically driving the rotor 70 develops a torque which is too great for efficient operation of the aircraft. However, this objectionable torque between the engine 27 and the frames 22 and 17 and the fuselage 16, 127 is substantially minimized by novel features of the previous described structure. Said novel features primarily involve the rotatably mounted compressor 38, which as previously stated revolves with the rotor shaft 53 and rotor 70.

As the compressor 38 revolves around the eccentric or crank 48 which is held stationary, a reciprocating motion is imparted to the pistons 45. Consequently, said pistons in traveling away from the outer ends of their cylinders 44 will create a vacuum in the outer cylinder portions so that air is drawn into the cylinders through the inlet ports 68. Thereafter on the outward travel of the pistons 45 toward the cylinder ends 66 the inlet port check valves 69 will be closed and the compressed air will be forced past the outwardly opening check valves 67 and through the conduits 65 into the hollow shaft portion 64. The compressed air from said hollow shaft portion 64 will pass through the flexible conduits 92 and thence through the conduits 89 of the wings or blades 76 from whence the compressed air will be discharged through the restricted outlet nozzles 90 at the tips 87 and adjacent the trailing edges 88 of the wings 76. Thus, the rotor 70 will then be driven in the direction as indicated by the arrows 129 by the jets of air emitted from the nozzles 90 and supplied by the compressor 38 for driving the rotor 70 by a jet force thereby substantially eliminating or minimizing the mechanical driving of the rotor through the shaft 53, so that the rotor will be substantially free running and will afford practically no drag or torque on the shaft 53.

As previously stated, to cause the aircraft 15 to ascend substantially vertically, the rotor 70 is disposed with its longitudinal axis in substatnially a horizontal plane or at substantially a right angle to the vertical axis of the aircraft. After the aircraft has risen to a desired elevation, translational movement in a forward direction can be accomplished by the pilot releasing the latch 126 and swinging the lever arm 123 upwardly. This will cause the lever arm 122 to swing upwardly and rearwardly. This movement will cause the roller 121 to ride upwardly and rearwardly along the arcuate surface 120 for camming the engine 127 upwardly, so that said engine and the frame 22 to which it is secured will be rocked downwardly and forwardly or counterclockwise about its transverse axis 20. Conversely, movement of the lever arm 123 downwardly will cause the frame 22 to rock in the opposite direction or clockwise about the axis 20 due to the preponderance of the weight borne by said frame 22 being disposed rearwardly of the shaft 20, so that the aircraft may thus be caused to travel rearwardly. Likewise, the aircraft may be caused to move sidewise by operation of the lever 114. Swinging movement of the lever 114 to the right will cause the flexible member 117 to be slacked off and a downward pull exerted on the flexible member 116 for rocking the frame 22 and the parts mounted thereon counterclockwise or to the left about the pivot 26 for causing the aircraft to move to the left. Similarly, by swinging the lever 114 to the left a pull will be exerted on the flexible member 117 for swinging the frame 22 and parts supported thereby to the right and for causing movement of the aircraft to the right.

It will also be understood that normal flight of the aircraft in a forward direction can be controlled in a conventional manner by operation of the control surfaces 128.

The lower end of the flexible member 106 is conveniently disposed to be actuated by the pilot. A downward pull thereon will produce a downward rocking movement of the lever 104 and a downward pull on the fork 99, 100 which will thus displace the collar 94 downwardly for exerting an inward pull on the rods 111 and a downward pull on the trailing ends of the wings or blades 76, for thus increasing the pitch of said blades. A slacking off of the flexible member 106 will enable the blades 76 to turn in the opposite direction about their longitudinal axes to assume positions with their planes more nearly at a right angle to the axis of the shaft 53 for thus reducing the pitch of the blades. Due to the normal tendency of the blades to assume minimum pitched positions when in operation, this will be accomplished automatically upon slacking off the flexible member 106. Suitable means, not shown, may be provided for anchoring the lower end of the flexible member 106 to maintain any desired pitch of the wings 76. It will be understood that the wings 76 are mounted to swivel about their longitudinal axes due to the fact that the inner shaft ends 77 thereof are swivelly or turnably mounted in the sleeves 71. It will also be understood that the fork head 99 has a sufficiently loose fitting engagement between the upper flange 97 and the antifriction bearing 98, against which it bears, so that the collar 94 can rotate with the shaft 53 freely relative to said fork head 99.

Various modifications and changes are contemplated and may obviously be resorted to, without departing from the spirit or scope of the invention as hereinafter defined by the appended claims.

I claim as my invention:

1. In a helicopter, a rigid lower frame, an upper frame, means supporting said upper frame on the lower frame for rocking movement in a plurality of directions, a power source supported by said upper frame, a compressor rotatably supported in said upper frame, means forming a driving connection between said power source and the compressor for revolving the compressor, said compressor including parts movable relative to one another, a fixed means about which the compressor rotates and to which one of said parts is connected to effect relative movement between said part and another part of the compressor when the compressor is revolved, a rotor shaft fixed to and extending upwardly from said compressor and rotatable with said compressor about an axis disposed axially of the rotor shaft, a rotor fixed to an upper part of said shaft having lifting, sustaining and propelling blades, said blades having jet reaction nozzles opening outwardly thereof away from leading edges of the blades, and conduit means connecting said nozzles to the compressor whereby upon rotation of the compressor by said power source the rotor will be mechanically driven and a fluid medium under pressure will be supplied through said conduit means from the compressor to said nozzles.

2. In a helicopter, a rigid lower frame, an upper frame, means supporting said upper frame on the lower frame for rocking movement in a plurality of directions, a power source supported by said upper frame, a compressor rotatably supported in said upper frame, means forming a driving connection between said power source and the compressor for revolving the compressor, a rotor shaft fixed to and extending upwardly from said compressor and rotatable with said compressor about an axis disposed axially of the rotor shaft, a rotor fixed to an upper part of said shaft having lifting, sustaining and propelling blades, said blades having jet reaction nozzles opening outwardly thereof away from leading edges of the blades, and conduit means connecting said nozzles to the compressor whereby upon rotation of the compressor by said power source the rotor will be mechanically driven and a fluid medium under pressure will be supplied through said conduit means from the compressor to said nozzles, said compressor including a plurality of radially disposed cylinders, pistons reciprocably mounted in said cylinders, a fixed eccentric disposed in said compressor eccentrically of the axis of rotation thereof, and connecting rods connected to said pistons and to said eccentric whereby the pistons are reciprocated in the cylinders as the connecting rods travel about said eccentric.

3. A helicopter as in claim 2, a fixed shaft supported by said upper frame beneath and axially of the rotor shaft and on which said compressor is supported and journalled.

4. A helicopter as in claim 3, said eccentric constituting an axially offset part of said fixed shaft.

5. In a helicopter as in claim 4, a bevel gear fixed to and supported beneath said compressor and journalled on fixed shaft, and a second bevel gear meshing with the first mentioned bevel gear and connected to and driven by said power source, said bevel gears constituting said means forming a driving connection between the power source and said compressor.

6. In a helicopter as in claim 5, said compressor cylinders having outer ends provided with intake ports, an inwardly opening check valve mounted in each of said intake ports, said conduit means including branch conduits connected to and leading from each of said cylinders adjacent the outer end thereof, and an outwardly opening check valve mounted in each of said branch conduits.

7. In a helicopter as in claim 6, said conduit means additionally including a hollow chamber formed in said rotor shaft and communicating with said branch conduits, flexible conduit elements connected to said rotor shaft chamber and leading therefrom, said rotor blades having shaft portions at their inner ends, said rotor including sleeve portions disposed between the blades and said rotor shaft in which the shaft portions of the blades are swivelly mounted, and said conduit means additionally including portions projecting from the shaft portions of the blades and radially outwardly from said sleeve portions and swingably disposed relatively to said sleeve portions and to which the opposite ends of said flexible conduit portions are connected.

8. In a helicopter as in claim 1, manually operable means for oscillating said upper frame and the parts supported thereby in one plane of movement, and a second manually actuated means for oscillating said upper frame and the parts supported thereby in another plane of movement disposed at an angle to said aforementioned plane of movement.

9. In a helicopter, a supporting frame, a power source supported by said frame, a compressor journalled in said frame, means forming a driving connection between said power source and compressor for revolving the compressor, said compressor including parts movable relative to one another, a fixed means about which the compressor rotates and to which one of said parts is connected to effect relative movement between said part and another part of the compressor when the compressor is revolved, a rotor shaft fixed to and extending upwardly from said compressor and disposed for rotation therewith about the axis of the shaft, and a rotor fixed to said shaft above the compressor and having sustaining and propelling blades spaced radially from said shaft, said rotor blades having jet reaction nozzles opening away from the leading edges thereof, and conduit means connecting said nozzles to the compressor whereby a fluid medium under pressure is supplied to the nozzles from the compressor by rotation of the compressor.

10. A helicopter as in claim 9, means supporting said frame for oscillating movement in a plurality of directions, and manually actuated means for rocking said frame and the parts supported thereby selectively in a plurality of directions and a plurality of planes.

References Cited in the file of this patent

UNITED STATES PATENTS

| | | |
|---|---|---|
| 840,339 | Johnson | Jan. 1, 1907 |
| 1,519,444 | Fales | Dec. 16, 1924 |
| 1,835,372 | Bender | Dec. 3, 1931 |
| 1,982,969 | Stalker | Dec. 4, 1934 |
| 2,192,893 | Butler | Mar. 12, 1940 |
| 2,404,014 | Thornes | July 16, 1946 |
| 2,418,407 | Hays | Apr. 1, 1947 |
| 2,589,030 | Alde | Mar. 11, 1952 |